United States Patent
Park et al.

(10) Patent No.: US 9,674,142 B2
(45) Date of Patent: Jun. 6, 2017

(54) MONITORING NETWORK TRAFFIC

(71) Applicant: KT CORPORATION, Gyeonggi-do (KR)

(72) Inventors: Tae-Min Park, Gyeonggi-do (KR); Bong-Ki Kim, Chungcheongbuk-do (KR); Hyun-Ho Jeong, Daejeon (KR); Young-Hun Hwang, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 22 days.

(21) Appl. No.: 14/518,011

(22) Filed: Oct. 20, 2014

(65) Prior Publication Data

US 2015/0113629 A1    Apr. 23, 2015

(30) Foreign Application Priority Data

Oct. 18, 2013 (KR) .......................... 10-2013-0124803

(51) Int. Cl.
*H04L 29/06* (2006.01)

(52) U.S. Cl.
CPC .......... *H04L 63/02* (2013.01); *H04L 63/0227* (2013.01); *H04L 63/0272* (2013.01); *H04L 63/0236* (2013.01); *H04L 63/1408* (2013.01)

(58) Field of Classification Search
CPC . H04L 63/02; H04L 63/0227; H04L 63/0272; H04L 63/0236; H04L 63/1408
USPC .................. 726/11–15, 22–24; 713/153, 154
See application file for complete search history.

(56) References Cited

U.S. PATENT DOCUMENTS

| | | | | |
|---|---|---|---|---|
| 7,574,737 B1* | 8/2009 | Loh | ...................... | H04L 63/0272 380/270 |
| 7,903,655 B2* | 3/2011 | Gooch | ................ | H04L 12/4633 370/392 |
| 8,856,869 B1* | 10/2014 | Brinskelle | ............... | H04L 63/08 726/12 |
| 9,043,463 B1* | 5/2015 | Cohn | .................. | H04L 63/0272 709/225 |
| 9,106,541 B2* | 8/2015 | Pardo-Blazquez | ..... | H04L 12/14 |
| 2002/0013844 A1* | 1/2002 | Garrett | ................ | H04L 12/2801 709/225 |
| 2005/0021740 A1* | 1/2005 | Bar | ...................... | H04L 63/0236 709/224 |
| 2007/0079366 A1* | 4/2007 | Geffner | ................... | H04L 63/02 726/12 |
| 2007/0147239 A1* | 6/2007 | Wu | ........................ | H04L 63/145 370/230 |

(Continued)

FOREIGN PATENT DOCUMENTS

| | | |
|---|---|---|
| KR | 10-2006-0035680 A | 4/2006 |
| KR | 10-1006372 B1 | 1/2011 |
| KR | 10-2011-0026926 A | 3/2011 |

*Primary Examiner* — John B King
(74) *Attorney, Agent, or Firm* — IP Legal Services, LLC (57) ABSTRACT

The disclosure is related to monitoring data traffic of user equipment through a monitoring node. A monitoring node may receive a data packet from user equipment registered for a monitoring service through a secure channel. The monitoring node may perform a monitoring operation on the received data packet and determine whether the received data packet is a malicious packet or a non-malicious packet. When the received data packet is a non-malicious packet, the monitoring node may transmit the data packet to a destination through a communication network.

19 Claims, 5 Drawing Sheets

(56) References Cited

U.S. PATENT DOCUMENTS

| | | | | |
|---|---|---|---|---|
| 2007/0261112 A1* | 11/2007 | Todd | ............... | G06F 21/577 |
| | | | | 726/11 |
| 2008/0178294 A1* | 7/2008 | Hu | ............... | G06F 21/552 |
| | | | | 726/24 |
| 2009/0064310 A1* | 3/2009 | Nakata | ............... | G06F 21/566 |
| | | | | 726/13 |
| 2010/0269149 A1* | 10/2010 | Lee | ............... | H04L 63/168 |
| | | | | 726/1 |
| 2013/0007882 A1* | 1/2013 | Devarajan | ............... | H04L 63/1416 |
| | | | | 726/24 |
| 2013/0170502 A1* | 7/2013 | Chen | ............... | H04L 63/0272 |
| | | | | 370/401 |
| 2014/0036921 A1* | 2/2014 | Hutt | ............... | H04L 49/25 |
| | | | | 370/392 |
| 2014/0380456 A1* | 12/2014 | Demopoulos | ............... | G06F 21/552 |
| | | | | 726/11 |
| 2015/0288719 A1* | 10/2015 | Freudiger | ............... | H04L 63/20 |
| | | | | 726/12 |
| 2015/0358281 A1* | 12/2015 | Chen | ............... | H04L 63/0272 |
| | | | | 726/12 |

* cited by examiner

MONITORING NETWORK TRAFFIC

CROSS REFERENCE TO PRIOR APPLICATIONS

The present application claims priority under 35 U.S.C. §119 to Korean Patent Application No. 10-2013-0124803 (filed on Oct. 18, 2013).

BACKGROUND

The present disclosure relates to monitoring data traffic and, more particularly, to protecting user equipment and information stored therein from malicious attack and hackers.

In order to protect computing systems and information stored therein from malicious attacks and hackers, many methods and systems have been introduced. Most of systems and methods are designed and implemented for protecting a massive amount of data or a large computing system. Accordingly, such systems and methods require high cost for implementation and maintenance.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, a subscriber's traffic path may be diverted to a predetermined network node designated to monitor the data traffic diverted from a subscriber's user equipment for protecting the subscriber's user equipment and information from malicious attacks.

In accordance with another aspect of the present embodiment, a service subscriber's traffic path may be detoured to a predetermined network node in order to enable a service provider to effectively manage and protect the data traffic of the subscriber for malicious attacks and hackers with minimum cost.

In accordance with still another aspect of the present embodiment, registered user equipment may transmit data to a destination and receive data from a sender through a monitoring node for protecting the registered user equipment and information stored therein from malicious attacks, such as hacking.

In accordance with yet another aspect of the present invention, registered user equipment transmits and receives only data verified by a monitoring node as non-malicious packet.

In accordance with at least one embodiment, a method may be provided for monitoring data traffic of user equipment through a monitoring node. The method may include generating a data packet to be transmitted to a predetermined destination through a communication network, diverting the generated data packet to a monitoring node through a secure channel established between the user equipment and the monitoring node, and requesting the monitoring node to transmit the generated data packet to the predetermined destination if the generated data packet is a non-malicious packet.

The diverting may include establishing a virtual private network (VPN) channel, as the secure channel, to the monitoring node, encapsulating the generated data packet based on a VPN protocol, and transmitting the encapsulated data packet to the monitoring node through the VPN channel.

The method may further include receiving an informing message from the monitoring node when the generated data packet is a malicious packet and terminated.

In accordance with another embodiment, a method may be provided for monitoring data traffic of user equipment through a monitoring node. The method may include receiving a data packet from other party through a communication network, diverting the received data packet to a monitoring node through a secure channel established between the user equipment and the monitoring node, and requesting the monitoring node to monitor the received data packet.

The diverting may include determining whether a source address of the received data packet is an address of the monitoring node and encapsulating the received data packet and transmitting the encapsulated data packet to the monitoring node when the source address is not the address of the monitoring node based on the determination result.

The diverting may further include processing the received data packet without the diverting the received data packet to the monitoring node when the source address is the address of the monitoring node based on the determination result.

The method may further include receiving an encapsulated packet from the monitoring node in response to the requesting when the received message is a non-malicious data packet and decapsulating the encapsulated packet and processing the encapsulated packet.

The method may further include receiving an informing message from the monitoring node in response to the requesting when the received message is a malicious data packet.

In accordance with still another embodiment, a method may be provided of monitoring data traffic of user equipment through a monitoring node. The method may include receiving a data packet from user equipment registered for a monitoring service through a secure channel, performing a monitoring operation on the received data packet, and determining whether the received data packet is a malicious packet or a non-malicious packet.

The receiving may include receiving an encapsulated data packet, as the received data packet, through a virtual private network (VPN) channel, as the secure channel and decapsulating the received encapsulated data packet using a predetermined description key.

The performing the monitoring operation may include performing a firewall operation on the received data packet to determine whether the received data packet is generated and has contents in accordance with a predetermined security policy.

The performing the monitoring operation may include performing a harmful site blocking operation on the received data packet to determine whether the receive data packet is associated with a harmful site based on at least one of a destination address and a source address of the received data packet.

The performing a harmful site blocking operation may include identifying at least one of a source address and a destination address of the received data packet, discovering a site associated with at least one of the source address and the destination address, and determining whether the discovered site is a harmful site, wherein when the discovered site is the harmful site, the received packet is determined as a malicious packet.

The determining may include transmitting a request message to an associated server with information on the discovered site and/or the identified at least one of the source address and the destination address and receiving a response message from the associated server as a result of determining whether the discovered site is a harmful site.

The determining may include transmitting a request message to an associated server with information on the discovered site and/or the identified at least one of the source address and the destination address, receiving a restriction level of the discovered site from the associated server, and determining whether the discovered site is allowed to access based on the received restriction level of the discovered site.

When the received packet is a non-malicious packet, the method may further include changing a source address of the received packet to an address of the monitoring node and storing information on the changed source address, the source address before the change, a destination address of the received packet, and information on the associated user equipment in an address mapping table.

When the received data packet is a packet received from other party through a communication network, the method may further include encapsulating the data packet with the address changed and transmitting the encapsulated data packet to the user equipment through the secure channel.

When the received data packet is a data packet generated to be transmitted to a predetermined destination, the method may include transmitting the data packet to the predetermined destination through the communication network.

When the received packet is a malicious packet, the method may include terminating the data packet and transmitting an informing message to the user equipment through the secure channel.

The method may further include receiving a data packet from other party through a communication network, identifying a source address of the data packet, detecting user equipment associated with the identified source address based on a mapping table, determining whether the received data packet is a malicious data packet, and transmitting the received data packet to the detected user equipment through a secure channel when the received packet is not a malicious data packet, otherwise terminating the received data packet.

BRIEF DESCRIPTION OF THE DRAWINGS

The above and/or other aspects of the present invention will become apparent and more readily appreciated from the following description of embodiments, taken in conjunction with the accompanying drawings, of which.

DESCRIPTION OF EMBODIMENTS

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with at least one embodiment, a monitoring service may be provided to user equipment registered for the monitoring service in order to protect the registered user equipment and information stored therein from various types of malicious attacks. In particular, a monitoring node may be coupled to a plurality of registered user equipment through a secure channel and transmit and receive data for the registered user equipment when the data is inspected as non-malicious data. Hereinafter, an overview of providing such a monitoring service will be described with reference to FIG. 1.

Figure 1:
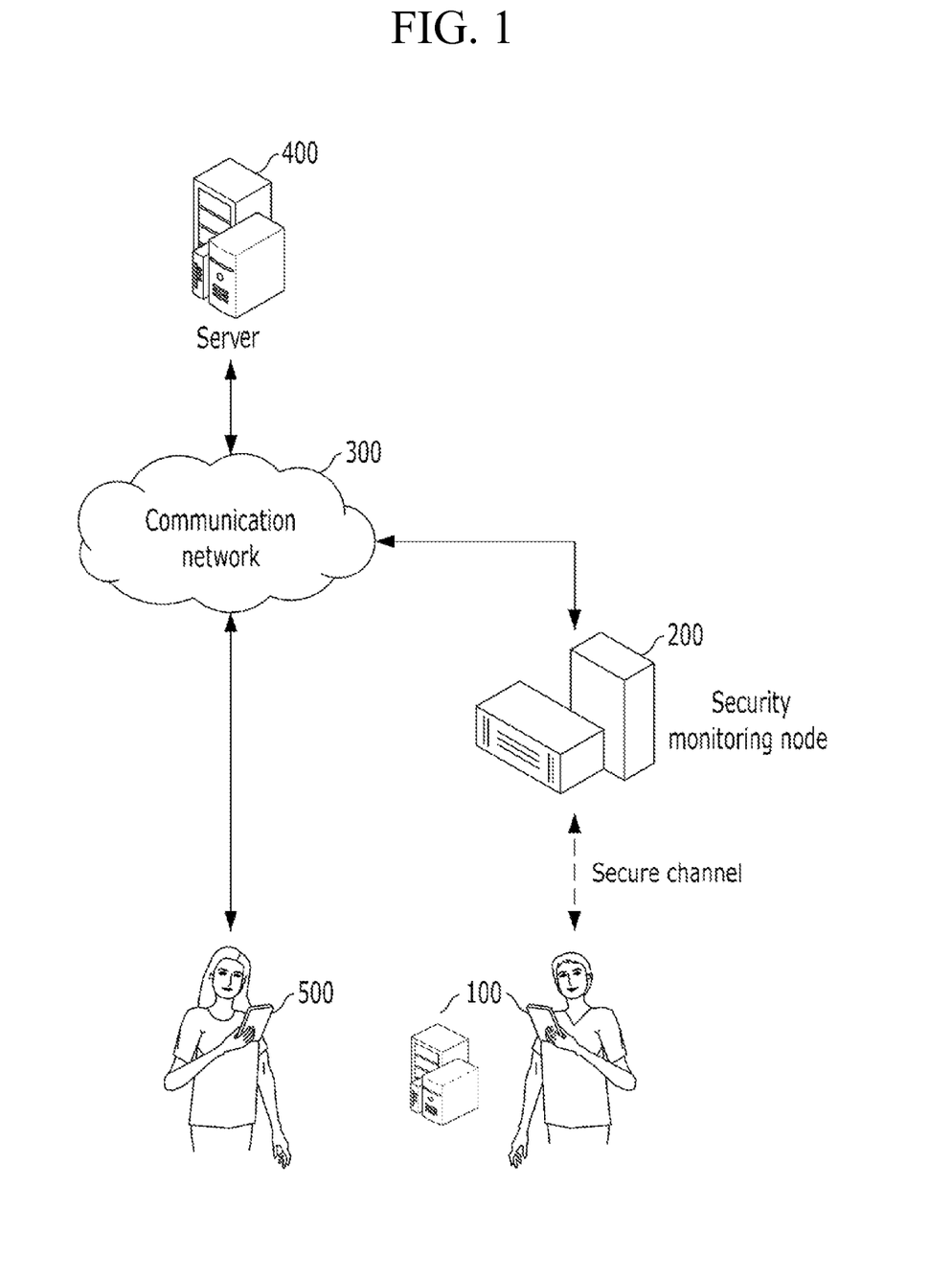
FIG. 1 illustrates an overview for providing a monitoring service in accordance with at least one embodiment.

FIG. 1 illustrates an overview for providing a monitoring service in accordance with at least one embodiment.

Referring to FIG. 1, user equipment (e.g., registered user equipment 100) communicates with others (e.g., unregistered user equipment 500) through monitoring node 200 in order to protect user equipment 100 and information stored therein from malicious attacks. In order to have such a service, user equipment 100 may be coupled with monitoring node 200 through a secure channel. For example, the secure channel may include a virtual private network (VPN) channel, a proxy channel, and so forth. User equipment 100 and monitoring node 200 may employ a VPN protocol (e.g., VPN communication scheme) to communicate with each other. Registered user equipment 100 denotes user equipment registered at monitoring node 200 for the monitoring service. Unregistered user equipment 500 denotes user equipment not registered at monitoring node 200 for the monitoring service. User equipment 100 and 500 may include a personal computer (PC), a personal digital assistant (PDA), a smart phone, a laptop computer, a tablet personal computer, a pad-like device and so forth.

In FIG. 1, registered user equipment 100 is illustrated as being coupled to communication network 300 through monitoring node 200, but the present invention is not limited thereto. For example, registered user equipment 100 may be coupled directly to communication network 300 and communicate with unregistered user equipment 500 or server 400 through communication network 300. In order to have the monitoring service, registered user equipment 100 communicates with entities in communication network 300 such as server 400 and unregistered user equipment 500 through monitoring node 200 in accordance with at least one embodiment.

Monitoring node 200 may be coupled to registered user equipment 100 through a secure channel (e.g., VPN channel or proxy channel) and coupled to communication network 300 through a communication link (e.g., a wired and/or wireless communication link). Monitoring node 200 may communicate other entities (e.g., unregistered user equipment 500 and server 400) coupled to communication network 300 through the communication link established between communication network 300 and monitoring node 200.

Monitoring node 200 monitors data traffic of registered user equipment 100 in accordance with at least one embodiment. In particular, monitoring node 200 receives data packets generated to be transmitted to a predetermined destination from registered user equipment and inspects the received data packets whether the received data packets are malicious data packets based on a security policy. When the received data packets are inspected as non-malicious packets, monitoring node 200 transmits the received data packets to the predetermined destination after changing a source address of the data packets from an address of registered user equipment 100 to an address of monitoring node 200. When the received data packets are inspected as malicious packets, monitoring node 200 discards or terminates the received data packets.

Furthermore, monitoring node 200 receives data packets from other entities to registered user equipment 100 before registered user equipment 100 and inspects the received data packets whether the received data packets are malicious packets. When the received data packets are inspected as non-malicious packets, monitoring node 200 transmits the received data packets to registered user equipment 100 (e.g., to a destination address in the received data packets). When the received data packets are inspected as malicious packets, monitoring node 200 discards (e.g., terminate, destroy) the received data packets.

Monitoring node 200 may perform various types of operations for determining whether a data packet is a malicious data packet or a non-malicious data packet. For example, monitoring node 200 may perform a firewall operation and a harmful site blocking operation, but the present invention is not limited thereto. That is, monitoring node 200 may perform an in-line deep packet inspection firewall operation, intrusion prevention operation, an application inspection and control operation, a secure sockets layer/secure shell (SSL/SSH) inspection operation, a website filtering, a quality of service (QoS)/bandwidth managing operation, and so forth. Furthermore, monitoring node 200 may enable a user to select at least one of such monitoring operations and perform the selected monitoring operations on data traffic associated with the user.

Server 400 of a service provider may be coupled to communication network 300 and manage monitoring node 200 in accordance with at least one embodiment. Server 400 may be a service server for providing a communication service to user equipment for data communication. Such server 400 may manage at least one monitoring node to monitor data traffic of registered user equipment (e.g., user equipment 100). Although FIG. 1 shows one monitoring node 200, the present invention is not limited thereto. For example, a plurality of monitoring nodes may be distributed over various locations. In this case, server 400 may allocate at least one of the monitoring nodes to each registered user equipment based on a location of respective user equipment.

In addition, server 400 (e.g., network operator or service provider) may use such monitoring node 200 to monitor data traffic (e.g., data packets) of a service subscriber (e.g., registered user equipment) and to protect the service subscriber from malicious attacks (e.g., hacking). That is, monitoring node 200 may be implemented as a security appliance farm (e.g., a centralized security middle box) to monitor and to protect a service subscriber. That is, monitoring node 200 may act as a proxy in monitoring data packets (e.g., data traffic) of a service subscriber (e.g., registered user equipment 100).

When a user registers at server 400 or monitoring node 200 for a monitoring service, the user's user equipment (e.g., registered user equipment 100) may be coupled to monitoring node 200 through a secure channel and transmit and receive data through monitoring node 200 in accordance with at least one embodiment. Such user equipment 100 will be described with reference to FIG. 2.

Figure 2:
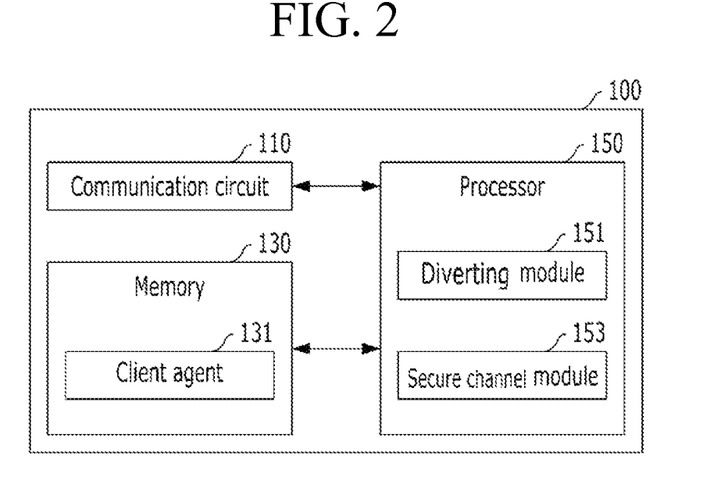
FIG. 2 illustrates user equipment in accordance with at least one embodiment.

FIG. 2 illustrates user equipment in accordance with at least one embodiment.

Referring to FIG. 2, user equipment 100 may include communication circuit 110, memory 130, and processor 150. Communication circuit 110 may receive information, data, and/or signals from and transmit information, data, and/or signal to other entities including unregistered user equipment 500, server 500, and monitoring node 200. Communication circuit 110 may include at least one module for communicating with other entities through communication network 300. For example, communication circuit 110 may include any or all of a broadcasting signal receiving module, a mobile communication module, a wireless internet module, a short-distance communication module, and a location information module (e.g., GPS receiving module). The short-distance communication module may include a Bluetooth circuit, a radio frequency identification (RFID) circuit, an infrared data association (IrDA) circuit, an ultra-wideband (UWB) circuit, a Zigbee circuit, and a near field communication (NFC) module circuit.

In particular, communication circuit 110 may transmit, to monitoring node 200, data generated by registered user equipment 100 to be transmitted to a predetermined destination (e.g., unregistered user equipment 500). Communication circuit 110 may receive, from monitoring node 200, data generated by other entity (e.g., unregistered user equipment 500) to be transmitted to registered user equipment 100.

Communication circuit 110 may transmit data to and receive data from monitoring node 200 through a secured channel, such as a VPN channel or a proxy channel. Communication circuit 110 may communicate with monitoring node 200 based on a predetermined communication protocol, such as a VPN protocol or a proxy protocol.

Memory 130 may store various information, for example, an operating system for controlling constituent elements, a designated application for having a monitoring service in connection with monitoring node 200 and server 400, and information necessary for having a monitoring service in connection with monitoring node 200 and server 400. In accordance with at least one embodiment, memory 130 may store client agent program 131 for interacting with monitoring node 200 or server 400 to have a monitoring service. Such client agent program 131 may be downloaded from monitoring node 200 and/or server 400. Alternatively, client agent program 131 may be a software application purchased with a predetermined fee from associated servers such as server 400 and monitoring node 200. Such memory 130 may be dynamic random access memory (DRAM), RAM bus DRAM (RDRAM), Synchronous DRAM, static RAM (SRAM), and so forth.

Processor 150 may control associated constituent elements. For example, processor 150 may be a central control unit (CPU), a microprocessor, and so forth. Particularly, processor 150 may perform various operations for having a monitoring service in connection with monitoring node 200 and/or server 400 in accordance with at least one embodiment.

In order to have such a monitoring service, processor 150 may include diverting module 151 and secure channel module 153 in accordance with at least one embodiment. Diverting module 151 may perform an operation for diverting data traffic to monitoring node 200 before processing the data traffic. For example, when user equipment 100 generates data packets to be transmitted to a predetermined destination, diverting module 151 transmits the generated data packet to monitoring node 200 through the secure channel established between user equipment 100 and monitoring node 200 and requests monitoring node 200 to transmit the generated data packet. Monitoring node 200 may transmit the data packet generated at user equipment 100 to a predetermined destination instead of user equipment 100 after performing a predetermined monitoring operation on the generated data packet. That is, monitoring node 200 transmits the generated data packet when the generated data packet is inspected as a non-malicious data packet.

When user equipment 100 receives a data packet from other entities excepting monitoring node 200, diverting module 151 may divert the received data packet to monitoring node 200 through a secure channel instead of processing the received data packet. In particular, diverting module 151 determines a source address of the received packet whether the source address is one of non-malicious addresses. Such non-malicious addresses may be previously decided and stored in user equipment 100 by at least one of a user, a service provider, a manufacturer, and so forth. Furthermore, such non-malicious addresses may be obtained as results of previous monitoring operations of monitoring node 200. That is, diverting module 151 delays processing or does not process the received packets when the received packets have a source address different from an address of monitoring node 200 or a source address not in the predetermined non-malicious addresses. In this case, diverting module 151 diverts the received packet to monitoring node 200. Diverting module 151 may receive an informing message from monitoring node 200 when a packet associated with user equipment 100 is inspected as a malicious packet.

In order to perform such a diverting operation, client agent program 151 may be initiated. Upon the initiation of client agent program 151, a secure channel may be established between monitoring node 200 and user equipment 100 and the diverting operation may be performed to divert data traffic of user equipment 100 to monitoring node 200 through the secure channel.

Secure channel module 153 establishes a secure channel to monitoring node 200 upon the initiation of client agent program 151. For example, Secure channel module 153 may form a secure channel (e.g., a VPN channel or a proxy channel) to monitoring node 200 in response to a request of diverting module 151 upon generation of a predetermined event such as initiation of client agent program 151. For example, secure channel module 153 may use a VPN protocol to establish the VPN channel and communicate with monitoring node 200 through the VPN channel. Secure channel module 153 may use a proxy protocol to establish a proxy channel and communicate with monitoring node 200 through the Proxy channel.

After establishing the secure channel, secure channel module 153 may encapsulate a packet and transmit the encapsulated packet to monitoring node 200 through the secure channel. When the packet is determined as a non-malicious packet as a result of a monitoring operation of monitoring node 200, secure channel module 153 receives the packet from monitoring node 200 through the secure channel. Secure channel module 153 decapsulates the packet. Then, processor 150 processes the decapsulated packet. For encapsulation and decapsulation, a predetermined encryption and decryption scheme may be employed.

As described, monitoring node 200 receives data traffic diverted from registered user equipment 100 or intercepts data traffic to registered user equipment 100 and performs a predetermined monitoring operation on the diverted and intercepted data traffic in order to protect registered user equipment 100 from malicious attacks. Hereinafter, monitoring node 200 will be described with reference to FIG. 3.

Figure 3:
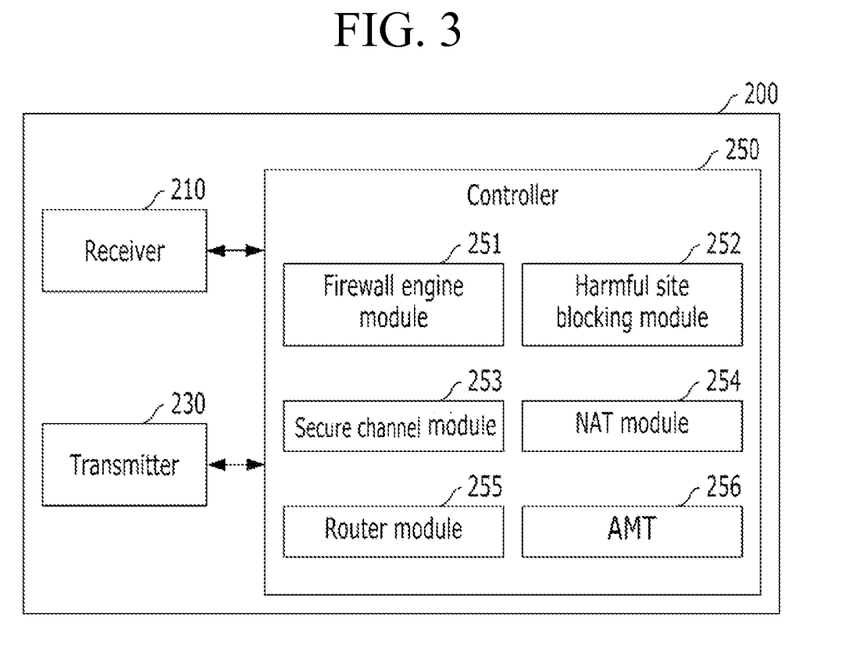
FIG. 3 illustrates a monitoring node in accordance with at least one embodiment.

FIG. 3 illustrates a monitoring node in accordance with at least one embodiment.

Referring to FIG. 3, monitoring node 200 may be coupled to registered user equipment 100 through a secure channel (e.g., VPN channel or proxy channel) and coupled to communication network 300 through a communication link (e.g., a wired and/or wireless communication link). Monitoring node 200 monitors data traffic associated with registered user equipment 100 in accordance with at least one embodiment. That is, monitoring node 200 performs a predetermined monitoring operation on data packets transmitted from registered user equipment 100 or transmitted to registered user equipment 100 in order to determine whether the data packet is a malicious packet or a non-malicious packet. In order to perform such operation, monitoring node 200 may include receiver 210, transmitter 230, and controller 250, but the present invention is not limited thereto.

Receiver 210 may be coupled to registered user equipment 100 through a secure channel and coupled to communication network 300 through a common communication link. Receiver 210 may receive packets diverted from registered user equipment 100 or intercepted before registered user equipment 100. The packets may be packets generated by registered user equipment 100 to be transmitted to other entities (e.g., unregistered user equipment 500). Furthermore, the packets may be packets received from other entities (e.g., unregistered user equipment 500) and generated by other entities (e.g., unregistered user equipment 500) to be transmitted to registered user equipment 500.

Transmitter 230 may be coupled to registered user equipment 100 through a secure channel and coupled to communication network 300 through a common communication link. Transmitter 230 may transmit, to a predetermined destination, packets i) generated by and received from registered user equipment 100 through the secure channel and ii) verified as a non-malicious packet as a result of performing a monitoring operation by controller 250 through communication network 300. In this case, a source address of the packet may be changed from an address of registered user equipment 100 to an address of monitoring node 200. Furthermore, transmitter 230 may transmit, to registered user equipment 100, packets received from other entities (e.g., unregistered user equipment 500) when the packets are verified as a non-malicious packet by controller 250.

Controller 250 may control constituent elements in monitoring node 200. For example, controller 250 may be a central control unit (CPU), a microprocessor, and so forth. Particularly, controller 250 may perform various operations for monitoring data traffic of registered user equipment 100 to protect registered user equipment 100 and information stored therein from malicious attacks and hackers in accordance with at least one embodiment.

In particular, controller 250 performs a monitoring operation on a packet associated with registered user equipment 100 for determining whether the packet is a malicious packet or a non-malicious packet in accordance with at least one embodiment. In order to perform such a monitoring operation, controller 250 may include a firewall engine module 251, a harmful site blocking module 252, a Secure channel module 254 and a network address translation (NAT) module 254, a router module 255, and an address mapping table (AMT) 256. For example, controller 250 may perform a firewall function, a harmful site blocking function, a router function, a network address transforming function, a traffic inspection and filtering function, and so forth.

Firewall engine module 251 analyzes a packet associated with registered user equipment 100 according to a predetermined security policy and determines whether the packet is a malicious packet or a non-malicious packet and the analysis result. That is, firewall engine module 251 may determine whether the received packet is generated and has contents in accordance with a predetermined security policy. For example, firewall engine module 251 may be set to apply the predetermined security policy, analyzes packets received from registered user equipment 100 through receiver 210, and determines whether the received packets are malicious packets or non-malicious packets based on the analysis result. If the packets are determined as the malicious packets, firewall engine module 251 discards or terminates the packets and does not deliver the packets to registered user equipment 100 or to a predetermined destination. If the packets are determined as non-malicious packets, firewall engine module 251 transmits the packet to a corresponding destination (e.g., unregistered user equipment 500) through communication network 300 or transmits the packets to registered user equipment 100 through a secure channel.

As described, firewall engine module 251 may employ a predetermined security policy to analyze a packet whether the packet is a malicious packet or a non-malicious packet. Such a security policy may be defined and stored by at least one of a service provider, a manufacturer, a user, a software designer, a related standard organization, and so forth. When the security policy is modified to change policies and updated to include new policies, firewall engine module 251 may download information on new security policies from server 400 and update the security policy based on the downloaded information on the new security policies. As described, server 400 may be a service platform server for managing monitoring node 200 and the monitoring operation. In order to manage monitoring node 200 and the monitoring operation, server 400 may performs user management, policy management by each user, VoC response, service platform management, and provisioning.

After analysis and determination, firewall engine module 251 may generate an informing message, as a result of determination, for informing of a corresponding user that a packet is discarded or terminated when the packet is determined as a malicious packet or that a packet is delivered when the packet is determined as a non-malicious packet. However, the present invention is not limited thereto. For example, when the packet is determined as a non-malicious packet, the generation and the delivery of the informing message may be omitted.

Harmful site blocking module 252 may analyze a packet, extract a destination address or a source address from the packet based on the analysis result, determine whether the packet is transmitted to a harmful site or received from a harmful site, and discard or terminate the packet if the packet is associated with the harmful site. That is, harmful site blocking module 252 may protect registered user equipment 100 from harmful sites.

In particular, harmful site blocking module 252 may discover a site (e.g., a website) associated with a destination address of a packet to be transmitted to other entities such as unregistered user equipment 500 or a source address of a packet received from other entities. Harmful site blocking module 252 determines whether the discovered site is a harmful site or not. Such determination may be performed through various methods. For example, harmful site blocking module 252 may inquire server 400 whether the discovered site is harmful site. In this case, harmful site blocking module 252 may transmit a request message to server 400 with information on the discovered site or information on the extracted destination or source addresses. Server 400 may include a database that stores a list of harmful sites defined and selected by a plurality of subscribers of server 400, a plurality of monitoring nodes under the management of server 400, and/or related organization defining and managing the harmful site list, and is updated based on results of previously performing the monitoring operations in the plurality of monitoring nodes under the management of server 400, but the present invention is not limited thereto.

In response to the request message with the information on the discovered site, server 400 may determine whether the discovered site is included in the harmful site list and provide a response message based on the determination result. In response to the request message with the information on the extracted destination address or the extracted source address, server 400 may discover a site associated with the extracted address, determine whether the discovered site is included in the harmful site list, and provide a response message based on the determination result.

Alternatively, harmful site blocking module 252 may request a harmful site list to at least one of server 400 and servers of predetermined organizations managing the harmful site list. In this case, harmful site blocking module 252 may receive the harmful site list from server 400 and determine whether the detected site is included in the received harmful site list. When the detected site is included in the received harmful site list, harmful site blocking module 252 determines that the detected site is the harmful site and informs controller 250 to discard or to terminate the associated packet having one of a destination address and a source address related to the harmful site.

In another embodiment, harmful site blocking module 252 may inquiry a restriction level of the detected site to at least one of server 400 and servers of predetermined organizations managing the harmful site list and the restriction levels. For example, harmful site blocking module 252 generates a request message to inquiry a restriction level of the detected site or the extracted destination address or source address and transmits the generated request message to server 400 with information on the detected site or the extracted destination address or source address. In response to such a request, server 400 may determine a restriction level of a detected site or may detect a site associated with the extracted address and determine a restriction level of the detected site.

The restriction level denotes a level of contents in a corresponding site, which is classified with regard to suitability for readers or viewers in terms of issues such as nudity (N), sexual content (S), violence (V), profanity (P), language (L), substance abuse (SA), and so forth. Each issue may include four levels 1-4 and each level may indicate a suitable age group. For example, nudity level 1 (N: level 1) may be defined to indicate that contents of a corresponding site is suitable for all age groups. Nudity level 2 (N: level 2) may be defined to indicate that contents of a corresponding site are suitable for an age group of 13 and above. Nudity level 3 (N: level3) may be defined to indicate that contents of a corresponding site is suitable for an age group of 18 and above. Nudity level 4 (N: level 4) may be defined to indicate that contents of a corresponding site is suitable for an age group of 21 and above. Other levels of the issues, such as sex, violence, and so forth, may be defined similar to the nudity levels.

In response to such a request for the restriction level, server 400 transmits a response message with the determined restriction level to harmful site blocking module 252. Based on the response and information on a corresponding user, harmful site blocking module 252 determines whether the discovered site is allowed to access. That is, the information on the corresponding user may include information on an age group associated with the corresponding user or an age group set by the corresponding user. Accordingly, harmful site blocking module 252 compares the age group of or set by the corresponding user and the restriction level and determines whether the detected site is allowable to access or not based on the comparison result. Such information on the corresponding user may be updated by the corresponding user upon generation of a predetermined event. That is, when the age group of the corresponding user is included in the restriction level, the detected site is allowed to be accessed. In this case, harmful site blocking module 252 may determine the packet is a non-malicious packet and inform controller 250 to process the packet. When the age group of the corresponding user is not included in the restriction level, the detected site is not allowed to be accessed. In this case, harmful site blocking module 25 may determine that the packet is a malicious packet and discard or termination the associated packet or inform controller 250 to discard or to terminate the packet.

After analysis and determination, harmful site blocking module 252 may generate an informing message, as a result of determination, for informing of a corresponding user that a packet is discarded or terminated when the packet is determined as a malicious packet or that a packet is delivered when the packet is determined as a non-malicious packet. However, the present invention is not limited thereto. For example, when the packet is determined as a non-malicious packet, the generation and the delivery of the informing message may be omitted.

Controller 250 of monitoring node 200 was described as performing only a firewall engine operation and a harmful site blocking operation through firewall engine module 251 and harmful site blocking module 252, but the present invention is not limited thereto Controller 250 of monitoring node 200 may perform an in-line deep packet inspection firewall operation, intrusion prevention operation, an application inspection and control operation, a secure sockets layer/secure shell (SSL/SSH) inspection operation, a website filtering, a quality of service (QoS)/bandwidth managing operation, and so forth. Furthermore, monitoring node 200 may enable a user to select at least one of such monitoring operations and perform the selected monitoring operations on data traffic associated with the user.

Secure channel module 253 establishes a secure channel (e.g., a VPN channel or a proxy channel) between registered user equipment 100 and monitoring node 200 in accordance with at least one embodiment. For example, secure channel module 253 may operate as a VPN server. In particular, secure channel module 253 may encapsulate or decapsulate a packet based on an encryption key or a decryption key. Such an encryption key or decryption key may be previously determined with registered user equipment 100 through the secure tunnel. Secure channel module 253 may encapsulate a packet having a destination address converted by NAT module 254.

NAT module 254 may convert a source address of a packet when the packet is determined as a non-malicious packet. For example, NAT module 254 changes a source address of a packet to an address of monitoring node 200. In particular, when monitoring node 200 receives a packet to be transmitted to other entities from registered user equipment 100, NAT module 254 converts a private source address of the packet to a public address of monitoring node 200. Here, the source address of the packet is an address of registered user equipment 100. Information on such address conversion may be stored in address mapping table (AMT) 256. That is, AMT 256 may store information on a source address of a packet before converting by NAT module 254, a converted address of the packet, a destination address of the packet, and associated registered user equipment in mapping relation.

Router module 255 may identify an address of associated registered user equipment when a packet is received from other entities through communication network 300. For example, router module 255 may detect a source address of the received packet, discover user equipment's address mapped to the detected source address by searching through AMT 256. Router module 255 routes the received packet to the user equipment based on the discovered address of the user equipment only when the received packet is determined as non-malicious packet by firewall engine module 251 and harmful site blocking module 252.

As described, monitoring node 200 performs a monitoring operation for determining whether a packet associated with registered user equipment 100 is a malicious packet or a non-malicious packet. Hereinafter, such a monitoring operation will be described with reference to FIG. 4.

Figure 4:
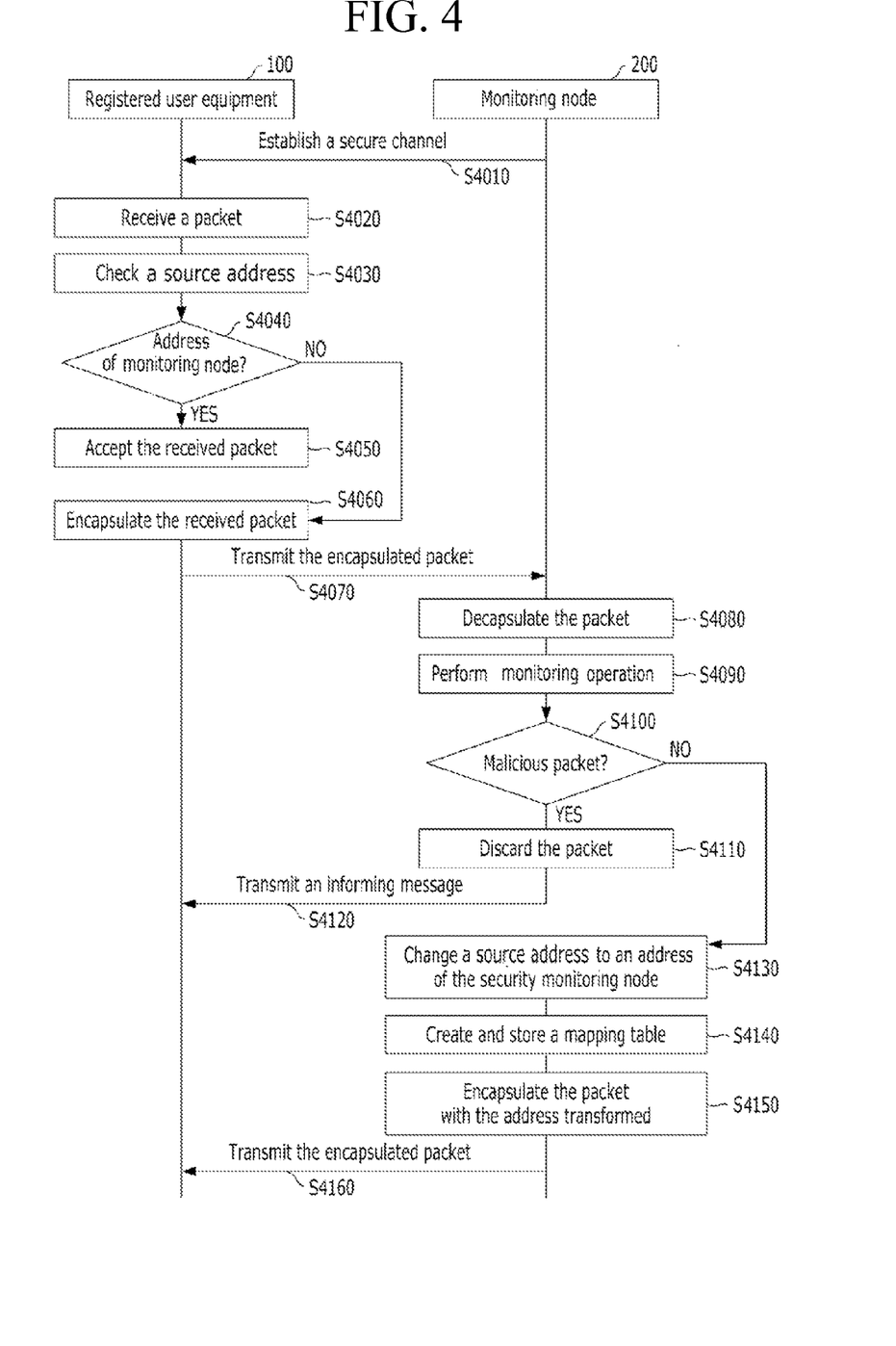
FIG. 4 illustrates a monitoring operation when user equipment receives a packet in accordance with at least one embodiment.

FIG. 4 illustrates a monitoring operation when user equipment receives a packet in accordance with at least one embodiment.

Referring to FIG. 4, a secure channel may be established between user equipment 100 and monitoring node 200 at step S4010. For example, when user equipment 100 requests a monitoring service to monitoring node 200 or server 400, monitoring node 200 establishes a VPN channel as the secure channel to user equipment 100 through VPN tunneling or establishes a proxy channel as the secure channel to user equipment.

When registered user equipment 100 receives a packet at step S4020, registered user equipment 100 discovers a source address of the received packet at step S4030. At step S4040, registered user equipment 100 determines whether the discovered source address of the received packet is an address of monitoring node 200.

When the discovered source address of the received packet is an address of monitoring node 200 (Yes—S4040), registered user equipment 100 accepts the received packet and processes the received packet at step S4050.

When the discovered source address of the received packet is not an address of monitoring node 200 (Yes—S4040), registered user equipment 100 encapsulates the received packet with a VPN encryption key at step S4060. Registered user equipment 100 transmits the encapsulated packet to monitoring node 200 through the secure channel at step S4070.

At step S4080, monitoring node 200 receives the encapsulated packet from registered user equipment 100 and decapsulates the received packet. At step S4090, monitoring node 200 performs a monitoring operation on the decapsulated packet for determining whether the decapsulated packet is a malicious packet or a non-malicious packet based on a predetermined security policy and/or for determining whether the decapsulated packet is associated with a harmful site.

Monitoring node 200 determines whether the decapsulated packet is a malicious packet based on the determination result at step S4100. When monitoring node 200 determines that the decapsulated packet is a malicious packet (Yes—S4100), monitoring node 200 discards or terminates the received packet at step S4110 and transmits an informing message to registered user equipment 100 at step S4120. When monitoring node 200 determines that the decapsulated packet is not a malicious packet (No—S4100), monitoring node 200 transforms a source address of the received packet to an address of monitoring node 200 at step S4130. Monitoring node 200 stores information on the source address of the received packet before the transformation, the transformed source address, and/or user equipment 100 in address mapping table 256 at step S4140. Then, monitoring node 200 encapsulates the packet having the transformed address at step S4150 and transmits the packet to registered user equipment 100 through the secure channel at step S4160.

Figure 5:
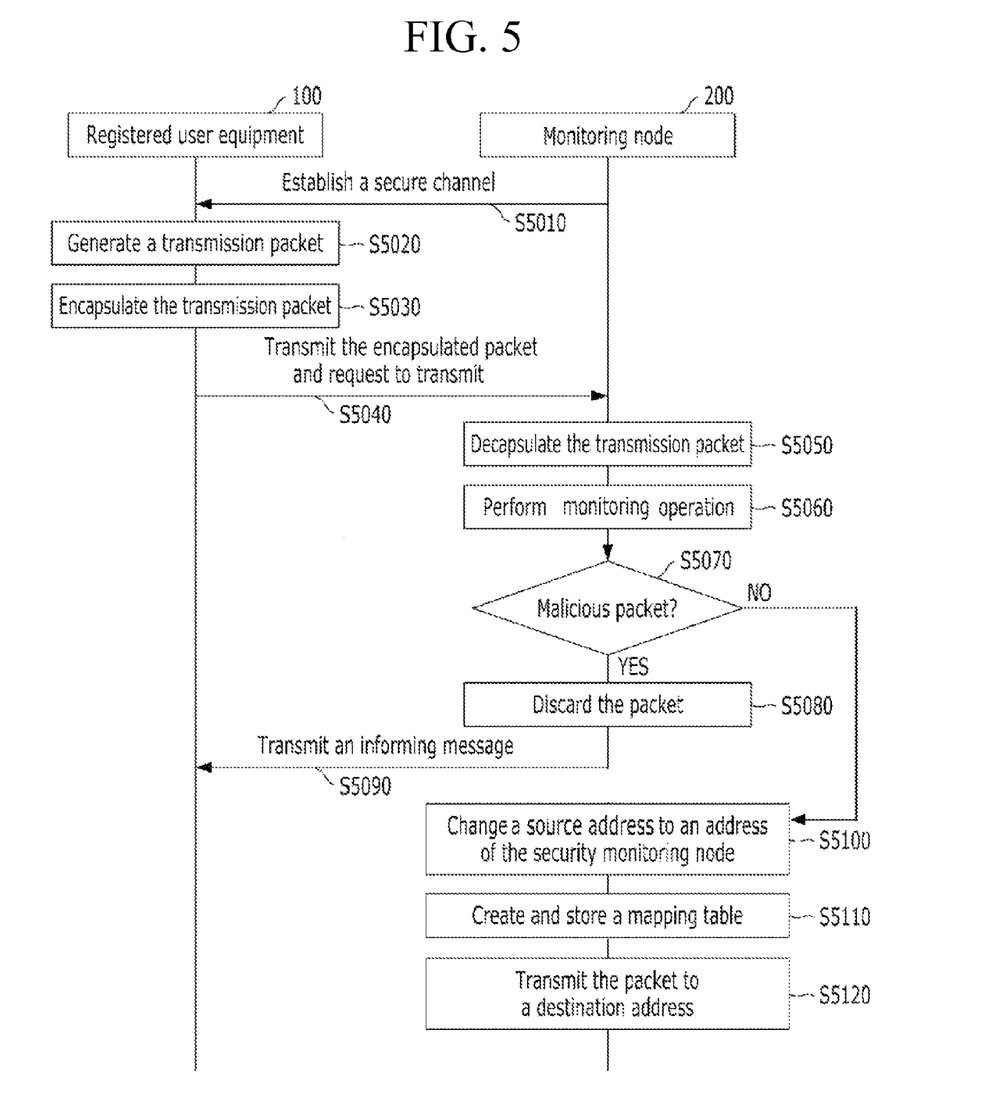
FIG. 5 illustrates a monitoring operation when user equipment transmits a packet in accordance with another embodiment.

FIG. 5 illustrates a monitoring operation when user equipment transmits a packet in accordance with another embodiment of the present invention.

Referring to FIG. 5, a secure channel may be established between user equipment 100 and monitoring node 200 at step S5010. For example, when user equipment 100 requests a monitoring service to monitoring node 200 or server 400, monitoring node 200 establishes a VPN channel as the secure channel to user equipment 100 through VPN tunneling or establishes a proxy channel as the secure channel to user equipment.

When registered user equipment 100 generates a packet to be transmitted at step S5020, registered user equipment 100 encapsulates the generated packet at step S5030 and transmits the encapsulated transmission packet to monitoring node 200 and request monitoring node 200 to transmit the encapsulated transmission packet at step S5040.

Monitoring node 200 receives the encapsulated transmission packet from registered user equipment 100 and decapsulates the received transmission packet at step S5050. At step S5060, monitoring node 200 performs a monitoring operation on the decapsulated packet. For example, monitoring node 200 may determine whether the decapsulated packet is a malicious packet based on a predetermined security policy and/or determine whether the decapsulated packet is associated with a harmful site.

At step S5070, monitoring node 200 determines whether the received transmission packet is a malicious packet based on the result of the monitoring operation. When the received transmission packet is determined as the malicious packet (Yes—S5070), monitoring node 200 terminates or discards the received transmission packet at step S5080 and transmits a malicious packet informing message to registered user equipment 100 at step S5090.

When the received transmission packet is determined as the non-malicious packet (No—S5070), monitoring node 200 transforms a source address of the received packet to an address of monitoring node 200 at step S5100 and stores the transformed source address, the source address before the transformation, and the destination address of the received packet in address mapping table 256 at step S5110. At step S5120, monitoring node 200 transmits the packet having the transformed source address to a destination through communication network 300.

Figure 6:
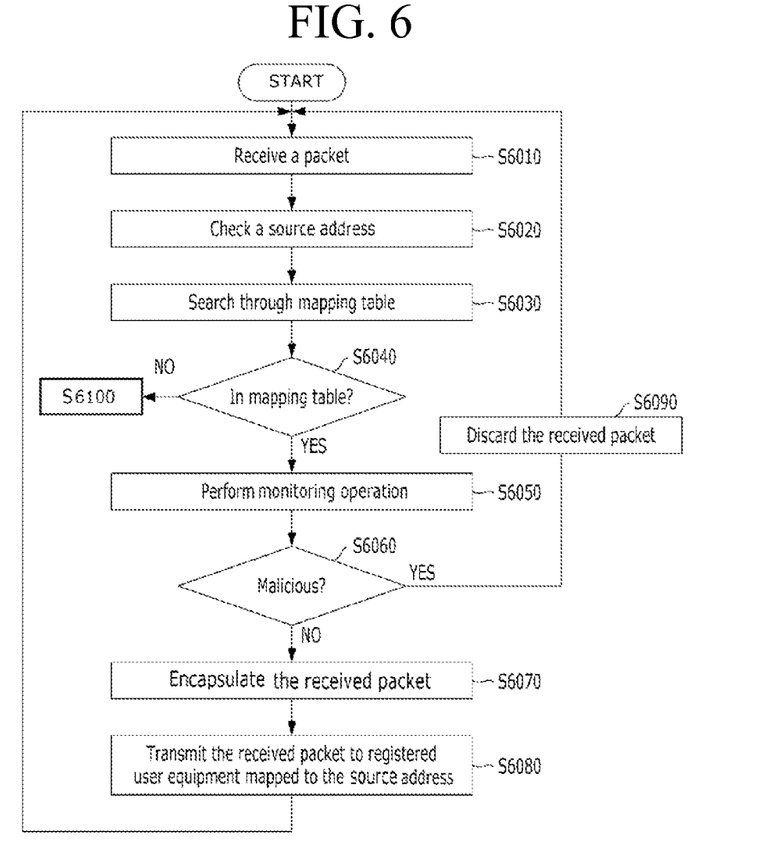
FIG. 6 illustrates a routing operation in a monitoring node in accordance with at least one embodiment.

FIG. 6 illustrates a routing operation in a monitoring node in accordance with at least one embodiment.

Referring to FIG. 6, monitoring node 200 receives a packet from other entities (e.g., unregistered user equipment 500) through communication network 300 at step S6010. At step S6020, monitoring node 200 discovers a source address of the received packet. At step S6030, monitoring node 200 searches through address mapping table 256.

At step S6040, monitoring node 200 determines whether the discovered source address is in address mapping table 256 based on the searching result. When the discovered source address is not in address mapping table 256 (No—S6040), monitoring node 200 may process the received packet and performs an operation based on the processing result since the received packet is not associated with user equipment under control of monitoring node 200 at step S6100. When the discovered source address is in address mapping table 256 (Yes—S6040), monitoring node 200 performs a monitoring operation at step S6050.

At step S6060, monitoring node determines whether the received packet is a malicious packet based on the result of the monitoring operation. When the received packet is determined as the non-malicious packet (No—6060), monitoring node encapsulates the received packet at step S6070 and transmits the received packet to registered user equipment mapped to the source address at step S6080. When the received packet is determined as the malicious packet (Yes—S6060), monitoring node 200 discards or terminates the received packet at step S6090.

Figure 7:
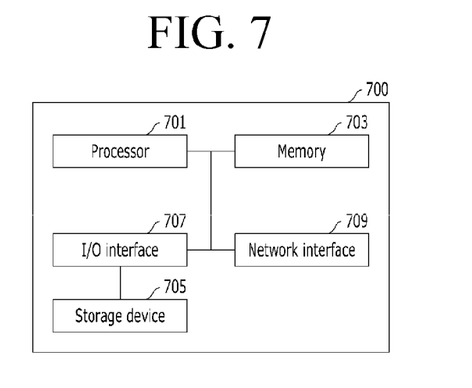
FIG. 7 illustrates a monitoring node in accordance with another embodiment.

FIG. 7 illustrates a monitoring node in accordance with another embodiment.

Referring to FIG. 7, monitoring node 200 may be implemented with various types of computing devices. For example, monitoring node 200 may be implemented with a computing device including processor 701, memory 703, secondly memory 705, input/output interface 707, and network interface 509.

Processor 701 may be a central processing unit (CPU) or a microprocessor. Memory 703 may be implemented with at least one of a dynamic random access memory (DRAM), a RAM bus DRAM (RDRAM), a Synchronous DRAM, a static RAM (SRAM), and so forth.

Secondary memory 705 may be at least one of a hard disk, a compact disk read only memory (DC-ROM), CD rewritable disk (CD-RW), a digital video disk ROM (DVD-ROM), DVD-RAM, DVD-RW disk, blue-ray disk, a flash memory, and so forth.

I/O interface 507 may enable processor 701 and/or memory 703 to access secondary memory 705. Network interface 709 may enable processor 701 and/or memory 703 to access communication network 300.

Processor 701 may load program instructions on memory 703 in order to perform operations associated with firewall engine module 251, harmful site blocking module 252, Secure channel module 253, NAT module 254, and router module 252. Furthermore, processor 701 may store AMT 256 in secondary memory 705.

Processor 701 may perform a firewall operation, a harmful site blocking operation, a VPN operation, a NAT operation, and a routing operation by controlling memory 703, secondary memory 705, I/O interface 707, and network interface 709.

Monitoring node 200 is illustrated as being implemented in a computing device in FIG. 7, but the present invention is not limited thereto. Monitoring node 200 may be implemented distributedly in a plurality of computing devices coupled through a communication network.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of monitoring data traffic through a monitoring device, the method comprising:
    establishing a secure channel between a user communication device and the monitoring device;
    performing, by the user communication device, a first monitoring procedure for a data packet generated for transmission to a predetermined destination through a communication network; and
    performing, by the user communication device, a second monitoring procedure for a data packet received through a communication network,
    wherein the first monitoring procedure includes:
        diverting the generated data packet to the monitoring device through the secure channel; and
        requesting the monitoring device to transmit the diverted data packet to the predetermined destination if the diverted data packet is a non-malicious packet;
    wherein the second monitoring procedure includes:
        determining whether a source address of the received data packet is an address of the monitoring device;
        diverting the received data packet to the monitoring device through the secure channel and requesting the monitoring device to monitor the diverted data packet, when the source address of the received data packet is determined not to be the address of the monitoring device; and
        determining the received data packet as a non-malicious packet and processing the received data packet without a data packet diverting operation, when the source address of the received data packet is determined to be the address of the monitoring device; and wherein the monitoring device is configured to perform a monitoring operation on a received data packet and to change a source address of the received data packet to the address of the monitoring device when the received data packet is non-malicious.

2. The method of claim 1, wherein the establishing comprises:
establishing a virtual private network (VPN) channel, as the secure channel, to the monitoring device; and
wherein the diverting includes:
encapsulating the generated data packet or the received data packet based on a VPN protocol; and
transmitting the encapsulated data packet to the monitoring device through the VPN channel.

3. The method of claim 1, wherein the first monitoring procedure further includes:
receiving an informing message from the monitoring device when the diverted data packet is a malicious packet and terminated.

4. A method of monitoring data traffic through a monitoring device, the method comprising:
receiving, by a user communication device, a data packet from at least one of a third-party device and the monitoring device through a communication network;
determining, by the user communication device, whether a source address of the received data packet is an address of the monitoring device;
diverting, by the user communication device, the received data packet to the monitoring device through a secure channel established between the user communication device and the monitoring device when the source address of the received data packet is determined not to be the address of the monitoring device;
requesting, by the user communication device, the monitoring device to monitor the diverted data packet; and
determining, by the user communication device, the received data packet as a non-malicious packet and processing, by the user communication device, the received data packet without the diverting the received data packet to the monitoring device, when the source address of the received data packet is determined to be the address of the monitoring device,
wherein the monitoring device is configured to perform a monitoring operation on a received data packet and to change a source address of the received data packet to the address of the monitoring device when the received data packet is non-malicious.

5. The method of claim 4, wherein the diverting comprises:
encapsulating the received data packet and transmitting the encapsulated data packet to the monitoring device when the source address is determined not to be the address of the monitoring device.

6. The method of claim 4, further comprising:
receiving an encapsulated packet from the monitoring device in response to the requesting the monitoring device to monitor the diverted data packet when the diverted data packet is a non-malicious data packet; and
decapsulating the encapsulated packet and processing the decapsulated packet.

7. The method of claim of claim 4, further comprising:
receiving an informing message from the monitoring device in response to the requesting the monitoring device to monitor the diverted data packet when the diverted data packet is a malicious data packet.

8. A method of monitoring data traffic associated with a user communication device, the method comprising:

receiving, by a monitoring device, a data packet from the user communication device registered for a monitoring service through a secure channel established between the user communication device and the monitoring device;
performing, by the monitoring device, a monitoring operation on the received data packet;
determining, by the monitoring device, whether the received data packet is a malicious packet or a non-malicious packet;
changing, by the monitoring device, a source address of the received data packet to an address of the monitoring device when the received data packet is the non-malicious packet; and
transmitting, by the monitoring device, the changed data packet to the user communication device or a predetermined destination of the received data packet,
wherein the transmitting includes:
when the received data packet is a data packet which is received by the user communication device from a third-party device other than the monitoring device through a communication network and diverted to the monitoring device by the user communication device, transmitting the changed data packet to the user communication device through the secure channel; and
wherein the user communication device is configured (i) to receive a data packet, and (ii) to determine the received data packet as a non-malicious packet and to process the received data packet without a data packet diverting operation, when a source address of the received data packet is the address of the monitoring device.

9. The method of claim 8, wherein the receiving of the monitoring device comprises:
receiving an encapsulated data packet, as the received data packet, through a virtual private network (VPN) channel, as the secure channel; and
decapsulating the received encapsulated data packet using a predetermined description key.

10. The method of claim 8, wherein the performing the monitoring operation comprises:
performing a firewall operation on the received data packet to determine whether the received data packet is generated and has contents in accordance with a predetermined security policy.

11. The method of claim 8, wherein the performing the monitoring operation comprises:
performing a harmful site blocking operation on the received data packet to determine whether the receive data packet is associated with a harmful site based on at least one of a destination address and a source address of the received data packet.

12. The method of claim 11, wherein the performing a harmful site blocking operation comprises:
identifying at least one of a source address and a destination address of the received data packet;
discovering a site associated with at least one of the source address and the destination address; and
determining whether the discovered site is a harmful site,
wherein, when the discovered site is the harmful site, determining the received packet is a malicious packet.

13. The method of claim 12, wherein the determining comprises:
transmitting a request message to an associated server with information on the discovered site and/or the identified at least one of the source address and the destination address; and receiving a response message from the associated server as a result of determining whether the discovered site is a harmful site.

14. The method of claim 12, wherein the determining comprises:
transmitting a request message to an associated server with information on the discovered site and/or the identified at least one of the source address and the destination address;
receiving a restriction level of the discovered site from the associated server; and
determining whether the discovered site is allowed to access based on the received restriction level of the discovered site.

15. The method of claim 8, comprising:
when the received packet is the non-malicious packet,
storing information on the changed source address, the source address before the change, a destination address of the received packet, and information on the associated user communication device in an address mapping table.

16. The method of claim 15, the transmitting includes:
when the received data packet is the data packet received from the third-party device through the communication network,
encapsulating the data packet with the address changed; and
transmitting the encapsulated data packet to the user communication device through the secure channel.

17. The method of claim 15, the transmitting includes:
when the received data packet is a data packet which is generated and diverted by the user communication device for transmission to the predetermined destination,
transmitting the data packet to the predetermined destination through the communication network.

18. The method of claim 8, comprising:
when the received packet is the malicious packet, terminating the data packet; and
transmitting an informing message to the user communication device through the secure channel.

19. The method of claim 8, comprising:
receiving a data packet from other party through a communication network;
identifying a source address of the data packet;
detecting a user communication device associated with the identified source address based on a mapping table;
determining whether the received data packet is a malicious data packet; and
transmitting the received data packet to the detected user communication device through a secure channel when the received packet is not a malicious data packet, otherwise, terminating the received data packet.

* * * * *